United States Patent [19]

Kapton et al.

[11] Patent Number: 5,117,880

[45] Date of Patent: Jun. 2, 1992

[54] SHIELD FOR CUTTING BLADE

[75] Inventors: Kenneth Kapton, Verona; Charles J. Baird, Pittsburgh, both of Pa.

[73] Assignee: Delta International Machinery Corporation, Pittsburgh, Pa.

[21] Appl. No.: 595,891

[22] Filed: Oct. 16, 1990

[51] Int. Cl.[5] .............................................. B27G 21/00
[52] U.S. Cl. ................................ 144/251 R; 83/440.2; 83/478; 83/860; 144/134 R; 409/134
[58] Field of Search ............. 409/134; 83/397, 397.1, 83/440.2, 478, 860; 144/134 R, 251 R, 251 A

[56] References Cited

U.S. PATENT DOCUMENTS

| 303,363 | 6/1884 | Harps . | |
|---|---|---|---|
| 306,407 | 10/1884 | Laufman . | |
| 337,493 | 3/1886 | Hall . | |
| 720,039 | 2/1903 | Lemmon . | |
| 822,636 | 6/1906 | Steer . | |
| 828,706 | 8/1906 | Bohling et al. . | |
| 883,148 | 3/1908 | Sanders . | |
| 907,734 | 12/1908 | Butterfield . | |
| 938,273 | 10/1909 | Richards . | |
| 955,482 | 4/1910 | Stewart . | |
| 973,837 | 10/1910 | Zastrow . | |
| 1,025,866 | 5/1912 | Erickson . | |
| 1,183,566 | 5/1916 | Jessrang . | |
| 1,706,156 | 3/1929 | Hall . | |
| 2,045,422 | 6/1936 | Tautz | 144/134 |
| 2,353,202 | 7/1944 | Tautz | 144/134 |
| 2,471,014 | 5/1949 | Trebert, Jr. | 144/288 |
| 2,642,104 | 6/1953 | Brown | 144/251 |
| 2,895,518 | 7/1959 | Rhett | 144/251 |
| 3,563,134 | 2/1971 | Toms | 143/6 |
| 3,568,567 | 3/1971 | Sack et al. | 90/11 |
| 3,754,493 | 8/1973 | Niehaus et al. | 144/251 R |
| 3,877,500 | 4/1975 | Ulmer | 144/251 |
| 3,884,094 | 5/1975 | Ulmer | 74/609 |
| 4,418,597 | 12/1983 | Krusemark et al. | 144/251 R |
| 4,454,898 | 6/1984 | Pavnica | 144/1 |
| 4,499,933 | 2/1985 | Thompson | 144/134 |
| 4,509,572 | 4/1985 | L'Archer, Jr. | 144/84 |
| 4,735,245 | 4/1988 | Cox | 144/251 R |
| 4,842,031 | 6/1989 | Peek | 144/251 |

Primary Examiner—W. Donald Bray
Attorney, Agent, or Firm—Merchant, Gould, Smith, Edell, Welter & Schmidt

[57] ABSTRACT

A bench type router/shaper which includes (i) a spindle drive pack which incorporates the motor and the spindle into a unitary package so as to establish and maintain a spacial relationship between the motor and the spindle, (ii) a semi-elastic drive belt encompassing the spindle and drive shaft which has a modulus of elasticity effective for providing effective power transmission while permitting removal and replacement of the drive belt without repositioning of the spindle and/or the drive shaft, (iii) a spindle adjustment mechanism for repositioning the longitudinal position of the spindle and thereby the depth of the cutter which includes a rotatable bell crank, a spindle in communication with the first extremity of the bell crank for linear movement of the spindle based upon rotational movement of the bell crank, and a rotatable handle in communication with the second extremity of the bell crank for producing rotation of the bell crank based upon rotation of the handle and (iv) a protective shield over the cutter which provides maximum protection with minimal interference and includes a horizontal plate which is laterally pivotable about a first pivot point proximate the right end of the horizontal plate, and a vertical plate which is longitudinally pivotally connected to the horizontal plate about a second pivot point proximate the left end of both plates.

5 Claims, 7 Drawing Sheets

SHIELD FOR CUTTING BLADE

FIELD OF THE INVENTION

Broadly, the invention relates to bench type power tools. More specifically, the invention relates to bench type routers/shapers which include (i) a spindle for transferring rotational power from the motor to the cutter, (ii) a mechanism which adjusts the depth of the cutter by adjusting the longitudinal position of the spindle, and (iii) a protective shield over the cutter for protecting the user and confining the sawdust/chippings.

BACKGROUND OF THE INVENTION

Bench type routers/shapers commonly include (i) a spindle for transferring rotational power from the motor to the cutter, (ii) a mechanism for adjusting the longitudinal position of the spindle and thereby adjust the depth of the cutter, and (iii) a protective shield over the cutter for protecting the user and controlling the spread of sawdust/chippings.

Use of a spindle to transfer rotational power from the motor to the cutter requires maintenance of the motor and the spindle in a fixed spacial relationship. Because of this need to maintain the relative positions of the motor and the spindle, repositioning of the spindle for the purpose of repositioning the cutter requires moving both the spindle and the motor.

A variety of generally effective spindle adjustment mechanisms capable of adjusting the position of the spindle while maintaining the relative spacial relationship between the spindle and the motor have been developed. However, the search continues for an inexpensive and reliable spindle adjustment mechanisms which is simple and convenient to operate.

A protective shield is provided over the cutter of routers and shapers for the purpose of preventing accidental contact with the cutter and confining the spread of sawdust/chippings generated by the cutter. Unfortunately, protective shields which provide maximum protection and containment typically result in significant interference with operation of the router/shaper. While a variety of protective shields have been developed in an effort to provide maximum protection with minimal interference, the search continues for improved shields.

Accordingly, a substantial need exists for a router/shaper which includes (i) a cost effective means for efficiently retaining the motor and the spindle in fixed spacial relationship during repositioning of the spindle, (ii) an inexpensive and reliable mechanisms for adjusting the position of the spindle which is simple and convenient to operate, and (iii) a protective shield which combines maximum protection and confinement with minimal interference.

SUMMARY OF THE INVENTION

Figure 1:
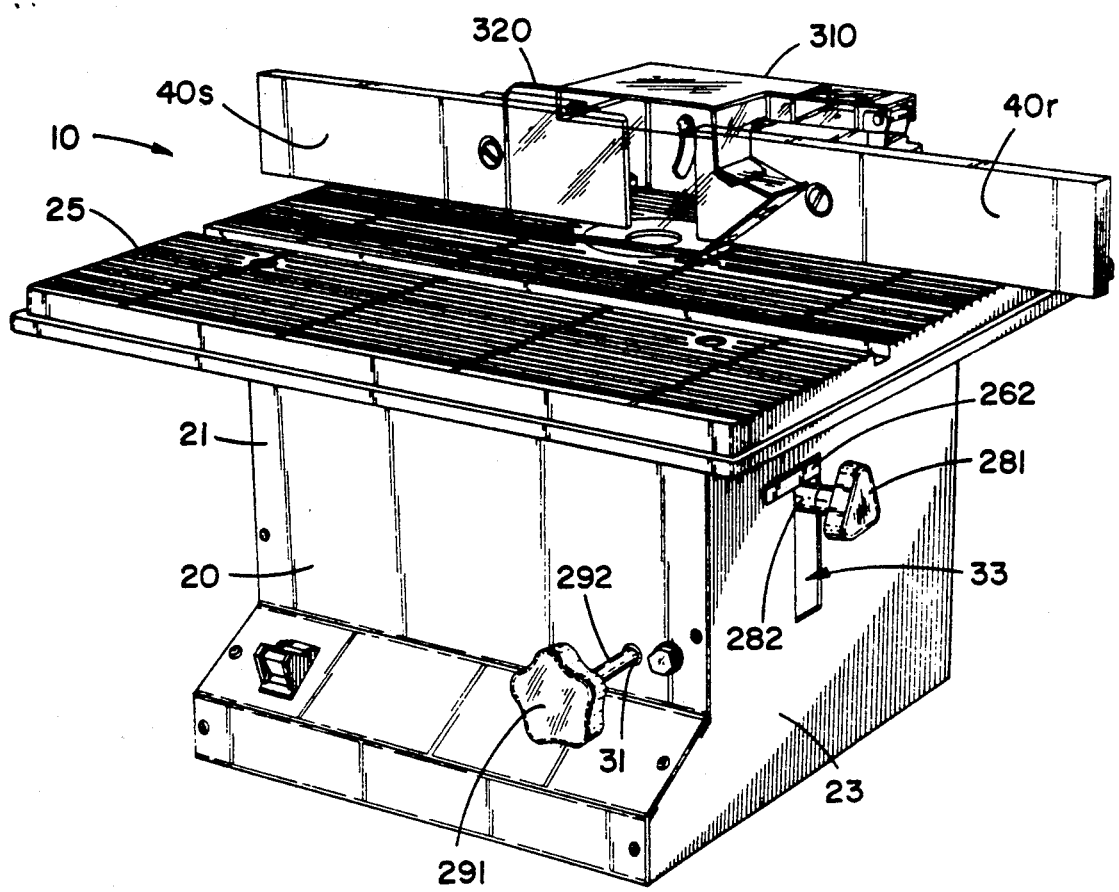
FIG. 1 is a perspective view of one embodiment of the invention.
Figure 2:
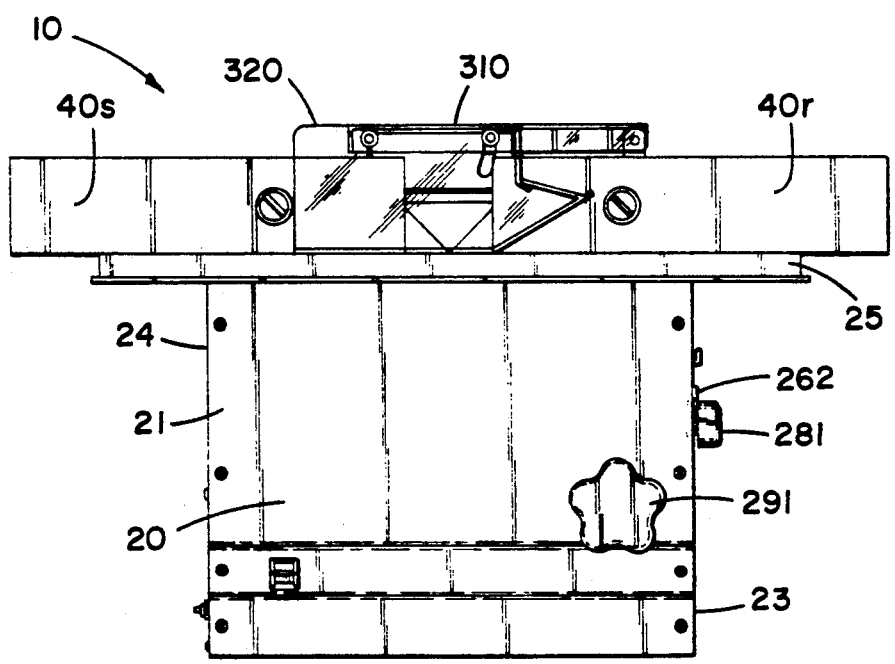
FIG. 2 is a front view of the invention embodiment depicted in FIG. 1.
Figure 3:
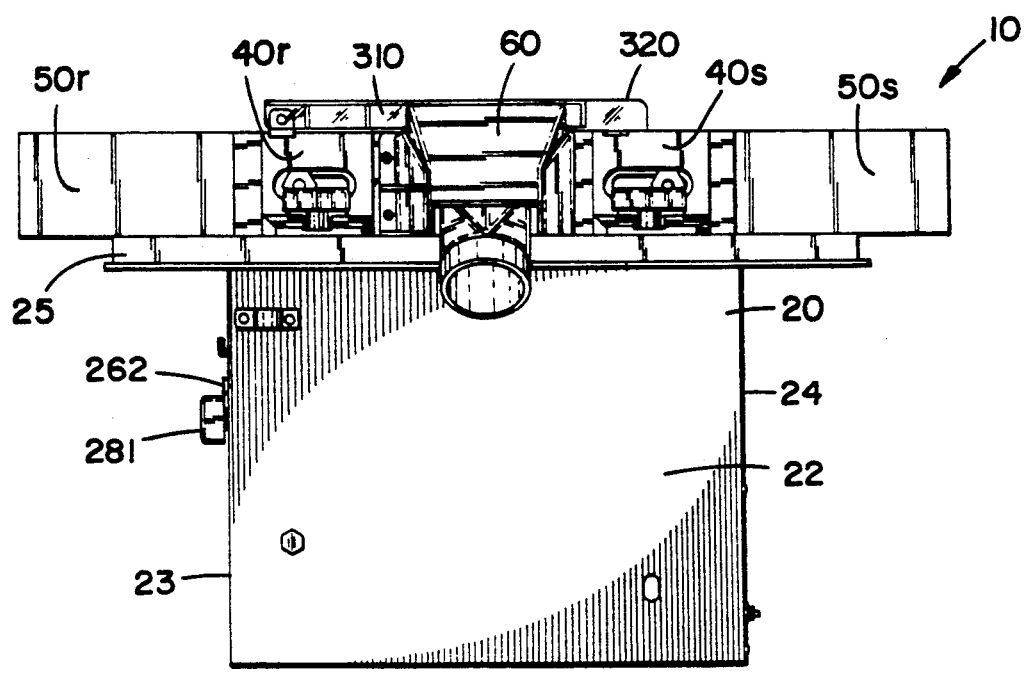
FIG. 3 is a rear view of the invention embodiment depicted in FIG. 1.
Figure 4:
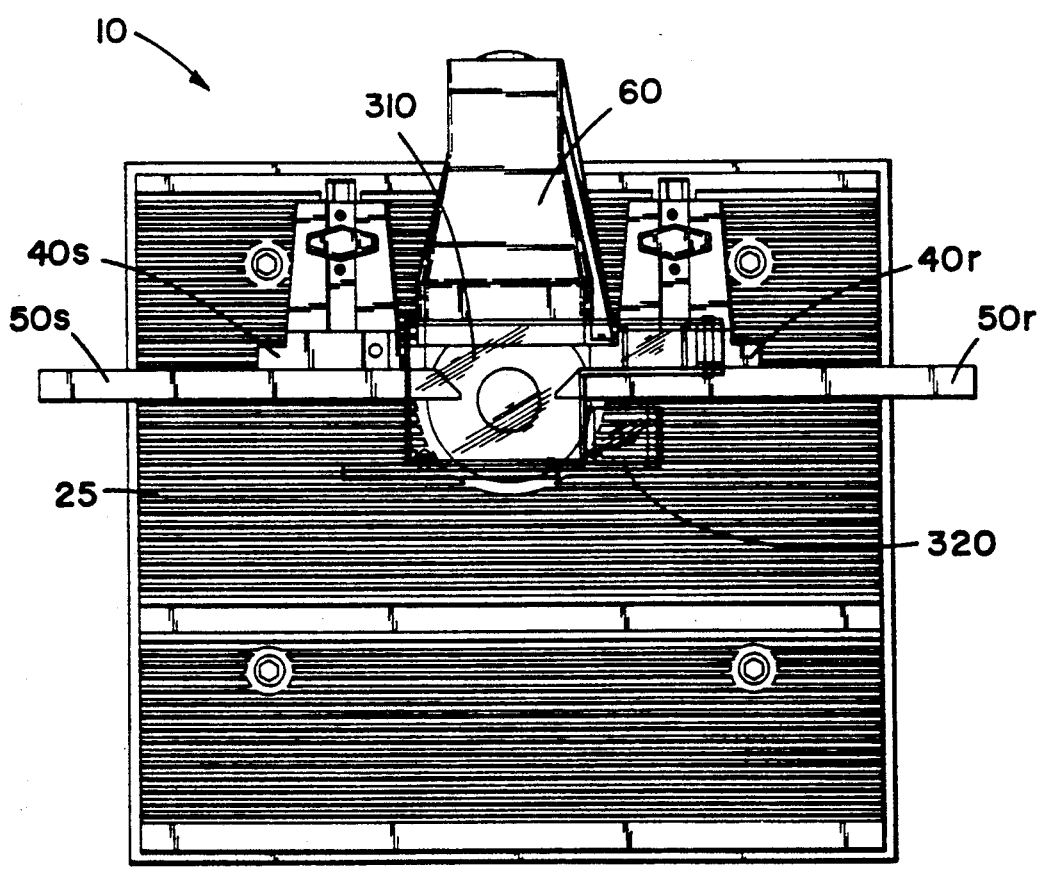
FIG. 4 is a top view of the invention embodiment depicted in FIG. 1.
Figure 5:
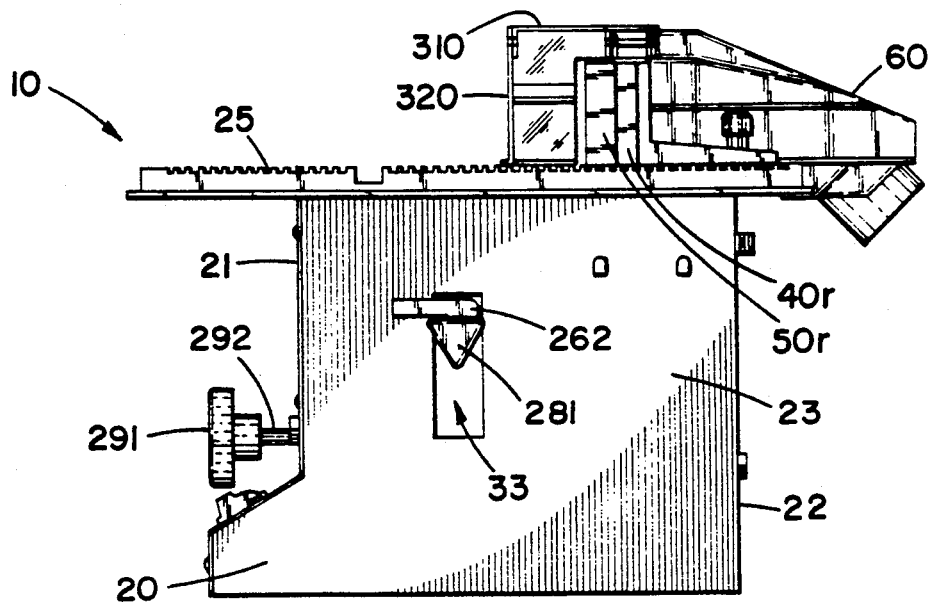
FIG. 5 is a right side view of the invention embodiment depicted in FIG. 1.
Figure 6:
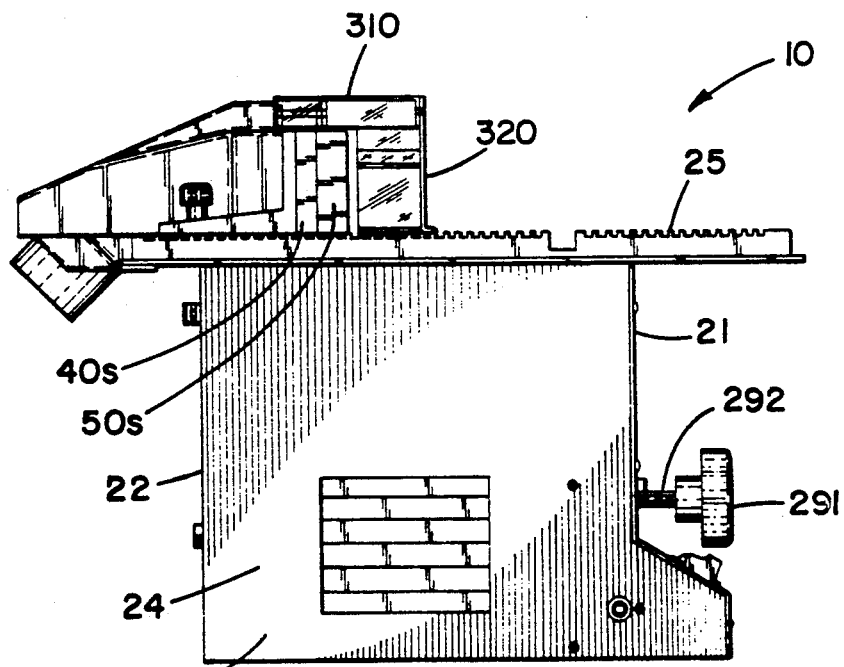
FIG. 6 is a left side view of the invention embodiment depicted in FIG. 1.
Figure 7:
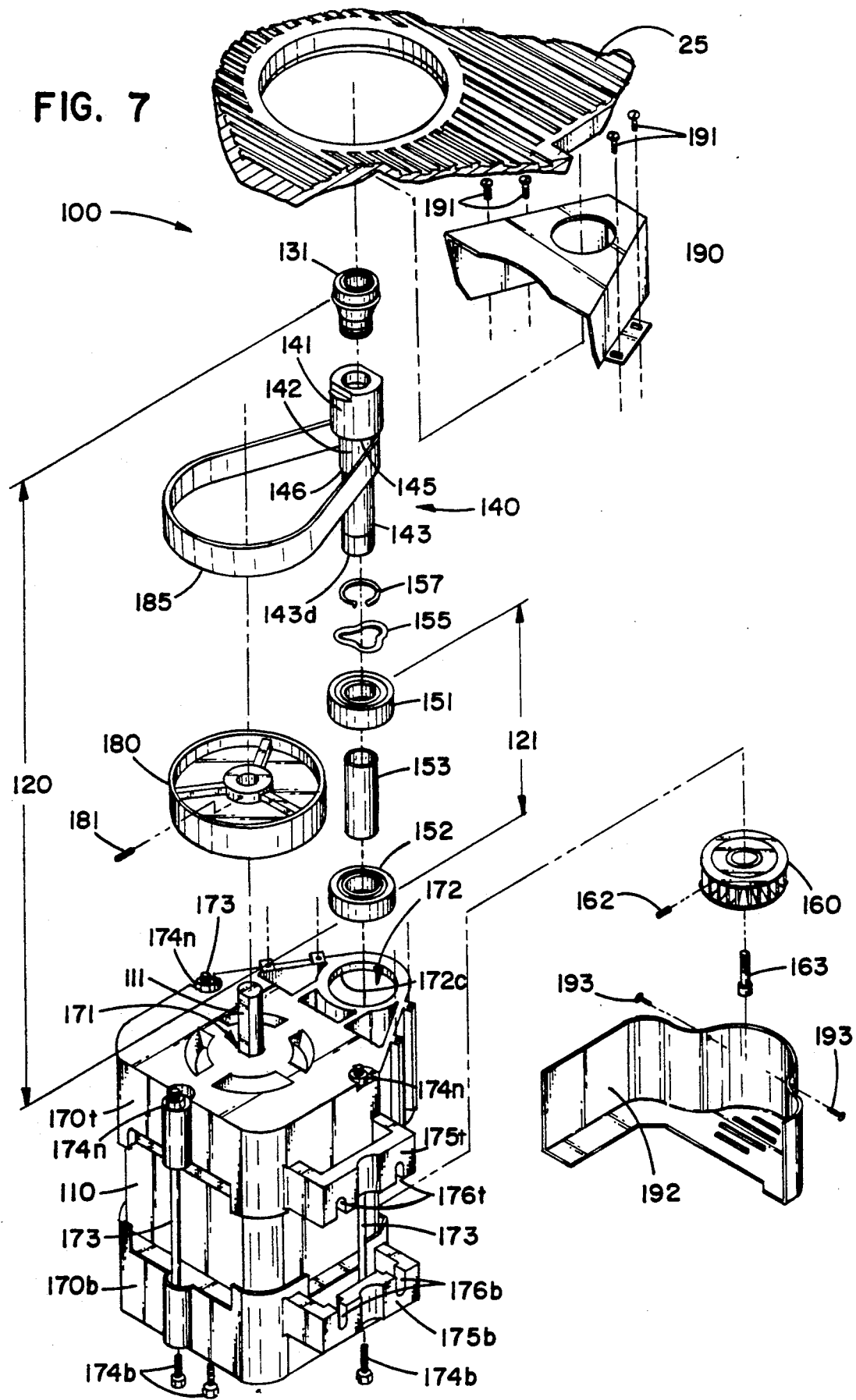
FIG. 7 is an exploded perspective view of one embodiment of the spindle drive pack portion of the invention embodiment depicted in FIG. 1.

A bench type router/shaper which includes (i) a spindle drive pack which incorporates the motor and the spindle into a unitary package so as to establish and maintain a spacial relationship between the motor and the spindle, (ii) an elastic drive belt encompassing the spindle and drive shaft which has a modulus of elasticity effective for providing sufficient tensioning to prevent slipping of the drive belt during operation and sufficient expandability to permit removal and replacement of the drive belt without repositioning of the spindle and/or the drive shaft, (iii) a convenient spindle adjustment mechanism for repositioning the longitudinal position of the spindle and thereby the depth of the cutter, and (iv) a protective shield over the cutter which provides maximum protection and confinement with minimal interference.

The spindle adjustment mechanism includes (−) a bell crank rotatable about a rotational axis proximate the vertex of the bell crank, (−) a spindle in communication with the first extremity of the bell crank for linear movement of the spindle based upon rotational movement of the bell crank about the rotational axis, and (−) a control mechanism which includes a rotatable handle and is in communication with the second extremity of the bell crank for producing rotation of the bell crank about the rotational axis by rotation of the handle.

The protective shield includes (−) a horizontal plate having a first lateral end and a second lateral end which is laterally pivotable about a first pivot point proximate the first lateral end of the horizontal plate, and (−) a vertical plate having a first lateral end and a second lateral end which correspond with the first and second lateral ends of the horizontal plate wherein the vertical plate is longitudinally pivotally connected to the horizontal plate about a second pivot point proximate the second longitudinal end of the plates.

DETAILED DESCRIPTION OF INVENTION INCLUDING A BEST MODE

Generically, the bench router/shaper 10 of the present invention includes those components typically found on bench routers and/or shapers including a motor, a spindle assembly, a spindle adjustment mechanism, a support frame, a working surface, a positionable fence assembly, a dust chute, and a protective shield. However, the present invention includes several unconventional features including (i) an unique spindle drive pack, (ii) a novel drive pack adjustment mechanism 200, and (iii) an innovative dual pivoting protective shield 300.

| Router/Shaper Generally | |
|---|---|
| Nomenclature | |
| 10 | router/shaper |
| 20 | frame |
| 21 | front panel |
| 22 | back panel |
| 23 | right side panel |
| 24 | left side panel |
| 25 | upper horizontal working surface |
| 31 | orifice through front panel |
| 33 | longitudinally extended opening in right panel |
| 40r | right side fence support |
| 40s | left side fence support |
| 41 | longitudinal hole through right side fence support |
| 50r | right side fence half |
| 50s | left side fence half |
| 60 | dust chute |

Referring to FIGS. 1–6, the bench router/shaper 10 is built upon a frame 20 which includes a front panel 21, a back panel 22, a right side panel 23, a left side panel 24 and an upper horizontal working surface 25. As with typical bench style routers/shapers, the bench style router/shaper 10 includes (—) adjustable right 50r and left 50s fence halves for guiding a workpiece (not shown), (—) right 40r and left 40s fence supports for adjustably attaching the fence halves 50r, 50s to the frame 20, and (—) a dust chute 60 for directing the sawdust/chippings generated by the cutter (not shown).

| Spindle Drive Pack | |
|---|---|
| Nomenclature | |
| 100 | spindle drive pack |
| 110 | motor |
| 111 | drive shaft |
| 120 | spindle assembly |
| 121 | subcombination |
| 131 | collet |
| 140 | spindle |
| 141 | arbor |
| 142 | pulley surface |
| 143 | spindle shaft |
| 143d | distal end of spindle shaft |
| 145 | first shoulder |
| 146 | second shoulder |
| 151 | first bearing |
| 152 | second bearing |
| 153 | spacer tube |
| 155 | wave washer |
| 157 | retaining ring |
| 160 | fan |
| 161 | bearing |
| 162 | roll pin |
| 163 | bolt connecting fan/spindle |
| 170 | end bell |
| 170t | upper section of end bell |
| 170b | lower section of end bell |
| 171 | orifice through upper section of end bell |
| 172 | spindle retention cavity defined by upper end bell |
| 172c | circumferential inner lip |
| 173 | connecting rods |
| 174n | nuts |
| 174b | bolts |
| 175t | upper mounting flange |
| 175b | lower mounting flange |
| 176t | notches in upper mounting flange |
| 176b | notches in lower mounting flange |
| 177 | nuts |
| 178 | bolts connecting clamping plate/end bell |
| 180 | pulley on motor drive shaft |
| 181 | roll pin |
| 185 | drive belt |
| 190 | arbor guard |
| 190z | opening through arbor guard |
| 191 | bolts connecting arbor guard/end bell |

-continued

| Spindle Drive Pack | |
|---|---|
| Nomenclature | |
| 192 | fan guard |
| 192z | opening through fan guard |
| 193 | bolts connecting fan guard/end bell |

The motor 110 and spindle assembly 120 of the router/shaper 10 are retained in fixed spacial relationship with respect to one another by means of an end bell 170. The end bell 170 sandwiches the motor 110 between an upper section 170t and a lower section 170b which are coupled by connecting rods 173. The connecting rods 173 are secured in position by nuts 174n threaded upon the upper ends (unnumbered) of the connecting rods 173 and bolts 174b threaded into the lower ends (unnumbered) of the connecting rods 173.

The upper section 170t of the end bell 170 includes a central orifice 171 for accommodating passage of the drive shaft 111 on the motor 110 and defines a spindle retention cavity 172 for rotatably retaining the spindle assembly 120 in a substantially parallel relationship to the motor drive shaft 111.

An appropriately dimensioned pulley 180 is mounted onto the drive shaft 111 by means of a roll pin 181 for providing the appropriate rotational ratio between the drive shaft 111 and the spindle 140.

A drive belt 185 encircles the pulley 180 and the spindle 140 for transferring rotational power from the drive shaft 111 to the spindle 140. The drive belt 185 is constructed from a semi-elastic material which has a modulus of elasticity effective for simultaneously providing sufficient tensioning so as to prevent slipping and sufficient expandability so as to permit removal and replacement of the drive belt 185 without repositioning of the drive shaft 111 and/or the spindle 140. Broadly, a drive belt 185 with a modulus of elasticity of about 1 to about 250 dynes/cm$^2$/cm, preferably about 100 to about 200 dynes/cm$^2$/cm, is effective for providing the desired balance between expandability and tensioning with a modulus of elasticity. A belt particularly suited for use in the spindle drive pack 100 is a Neoprene ® belt which includes a single ply of polyester manufactured by Belting Industries Company, Inc. of Kenilworth, N.J.

The spindle 140 includes (—) an uppermost threaded arbor 141, (—) an intermediate pulley surface 142, and (—) a lowermost shaft 143. The diameters of the arbor 141, pulley surface 142 and shaft 143 progressively decrease so as to define a downwardly facing first shoulder 145 at the junction of the arbor 141 and the pulley surface 142 and a downwardly facing second shoulder 146 at the junction of the pulley surface 142 and the shaft 143. The first shoulder 145 prevents the drive belt 185 from rising up on the pulley surface 142 and the second shoulder 146 prevents continued passage of the spindle 140 into the spindle retention chamber 172.

The spindle 140 is rotatably retained within the spindle retention cavity 172 upon a pair of longitudinally spaced bearings 151,152 with the distal end 143d of the spindle shaft 143 exposed through the bottom (unnumbered) of the spindle retention cavity 172. A rotatable spacer tube 153 separates the bearings 151,152. The spindle assembly 120 is secured into position within the spindle retention cavity 172 by the combination of (—) a retaining ring 157 secured between the first bearing 151 and a circumferential inner lip 172c on the retention cavity 172 which cooperates with the enclosed bottom (unnumbered) of the spindle retention cavity 172 for preventing longitudinal movement of the subcombination 121 of the first bearing 151, the second bearing 152 and the spacer tube 153, and (—) a bolt 163 threaded onto the distal end 143d of the spindle shaft 143 which secures the spindle 140 to the subcombination 121.

A wave washer 155 is provided between the first bearing 151 and the retaining ring 157 for exerting a longitudinally compressive force upon the subcombination 121 and thereby reduce wobbling of the spindle assembly 120 within the spindle retention cavity 172.

The arbor 141 threadably engages a collet 131 in typical fashion for securing a cutter (not shown). An arbor guard 190 is secured to the upper section 170t of the end bell 170 by bolts 191 for protectively encasing the arbor 141 and the gap (unnumbered) between the arbor 141 and the pulley 180. A central opening 190z through the arbor guard 190 provides longitudinal access to the top (unnumbered) of the arbor 141 for changing collets 131 and/or cutters (not shown).

A rotary fan 160 is attached to the distal end 143d of the spindle shaft 143 by the bolt 163 for cooling the spindle drive pack 100 during operation. A fan guard 192 is secured to the lower section 170 b of the end bell 170 by bolts 193 for protectively encasing the fan 160 without substantially interfering with the free flow of air. A central opening 192z through the arbor guard 190 provides longitudinal access to the bolt 163 for assembly and/or disassembly of the spindle assembly 120 within the spindle retention cavity 172.

The upper section 170t and lower section 170b of the end bell 170 each include a mounting flange 175t, 175b for facilitating attachment of the spindle drive pack 100 to the spindle drive pack adjustment mechanism 200.

Spindle Drive Pack Adjustment Mechanism
Nomenclature

| | |
|---|---|
| 200 | spindle drive pack adjustment mechanism |
| 210 | base plate |
| 211 | top of base plate |
| 212 | bottom of base plate |
| 213 | first side of base plate |
| 214 | second side of base plate |
| 215 | front of base plate |
| 216 | rear of base plate |
| 217 | first flange on first side of base plate |
| 218 | second flange on second side of base plate |
| 219 | intermediate flange |
| 221 | longitudinally extended opening through base plate |
| 221s | sides of longitudinally extended opening |
| 222 | laterally extended slot through base plate |
| 223 | bolt hole through base plate |
| 224a | hole through flange on first side of base plate |
| 224b | hole through flange on second side of base plate |
| 224c | hole through intermediate flange |
| 230f | forward half of clamping plate |
| 230r | rearward half of clamping plate |
| 231f | top of forward half of clamping plate |
| 231r | top of rearward half of clamping plate |
| 232f | bottom of forward half of clamping plate |
| 232r | bottom of rearward half of clamping plate |
| 233f | first side of forward half of clamping plate |
| 233r | first side of rearward half of clamping plate |
| 234f | second side of forward half of clamping plate |
| 233r | second side of rearward half of clamping plate |
| 235f | front face of forward clamping plate |
| 235r | front face of rearward clamping plate |
| 236f | rear face of forward clamping plate |
| 236r | rear face of rearward clamping plate |
| 237 | collar |
| 238 | bolt connecting f and r clamping plate halves |
| 241f | first bolt hole through forward half |

Spindle Drive Pack Adjustment Mechanism
-continued
Nomenclature

| | |
|---|---|
| 241r | first bolt hole through rearward half |
| 242f | first orifice through forward half |
| 242r | first orifice through rearward half |
| 243r | secondary bolt holes through rearward half |
| 244r | secondary orifices through rearward half |
| 245r | longitudinal side channels on rearward half |
| 246f | longitudinal side channels on forward half |
| 247f | notch on front half of clamping plate |
| 250 | shoe |
| 251 | central transverse extension |
| 252 | side transverse extensions |
| 253 | orifices through shoe |
| 260 | position indicator |
| 261 | connection plate |
| 262 | needle |
| 263 | extension bar |
| 264 | orifices through connection plate |
| 265 | bolts connecting indicator/shoe/clamping plate |
| 270 | bell crank |
| 271 | lateral arm |
| 271d | distal end of lateral arm |
| 272 | longitudinal arm |
| 272d | distal end of longitudinal arm |
| 273 | vertex |
| 274 | elongated orifice through first arm |
| 275 | elongated orifice through second arm |
| 276 | orifice proximate vertex of bell crank |
| 277 | bolt connecting bell crank/base plate |
| 280 | clamping knob |
| 281 | handle |
| 282 | shaft |
| 282p | proximal end of shaft |
| 282d | distal end of shaft |
| 283 | threaded orifice in distal end of shaft |
| 284 | washer |
| 285 | bolt connecting clamp halves/bell crank/shaft |
| 285d | distal end of bolt 285 |
| 286 | head of bolt 285 |
| 290 | positioning knob |
| 291 | handle |
| 292 | threaded shaft |
| 292p | proximal end of threaded shaft |
| 292d | distal end of threaded shaft |
| 293 | roll pin |
| 294 | first washer |
| 295 | second washer |
| 296 | adjusting nut |
| 297 | protuberance |
| 298 | threaded passageway through adjusting nut |

CONSTRUCTION

Figure 8:
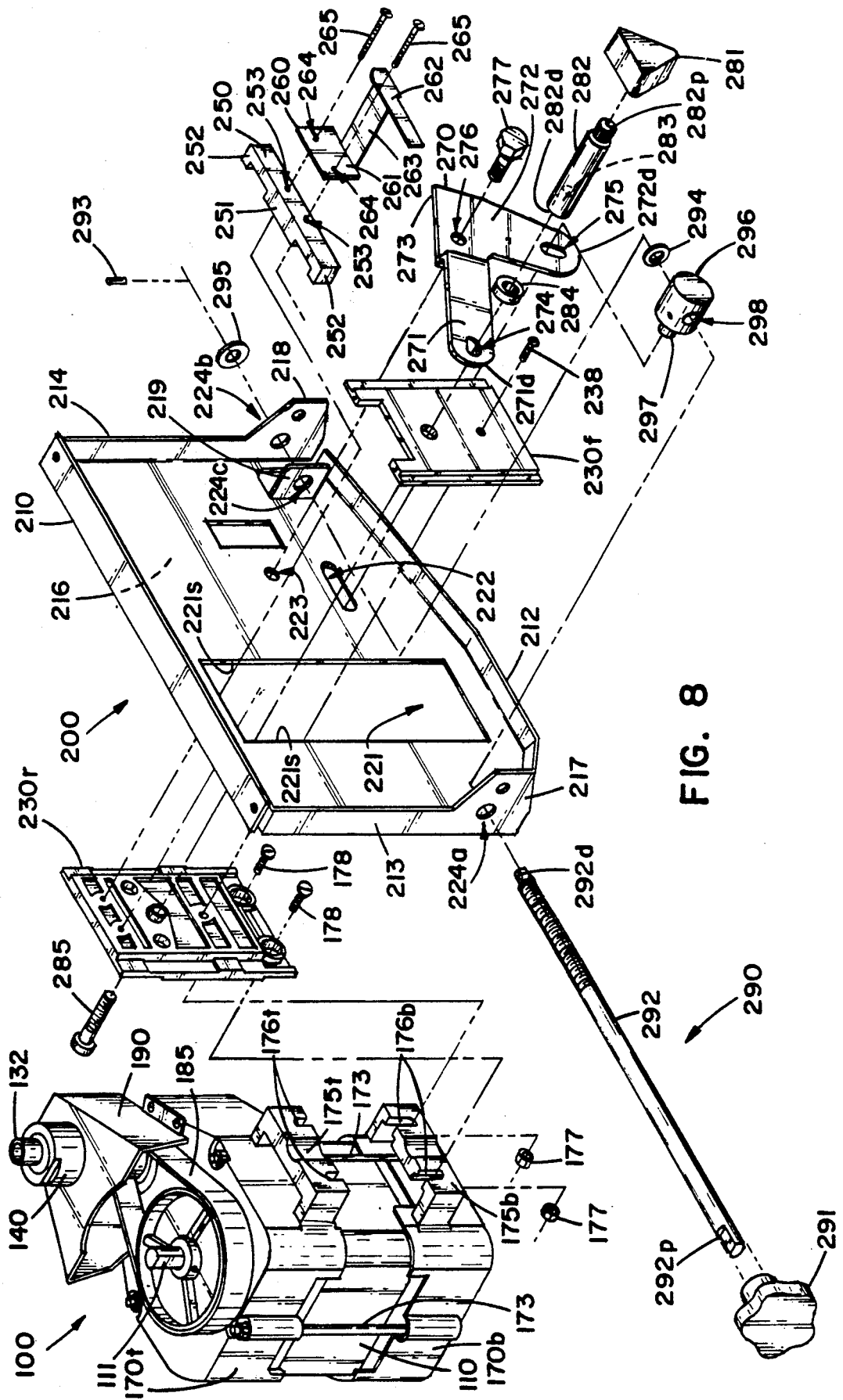
FIG. 8 is an exploded perspective view of one embodiment of the spindle adjustment mechanism portion of the invention embodiment depicted in FIG. 1.
Figure 9:
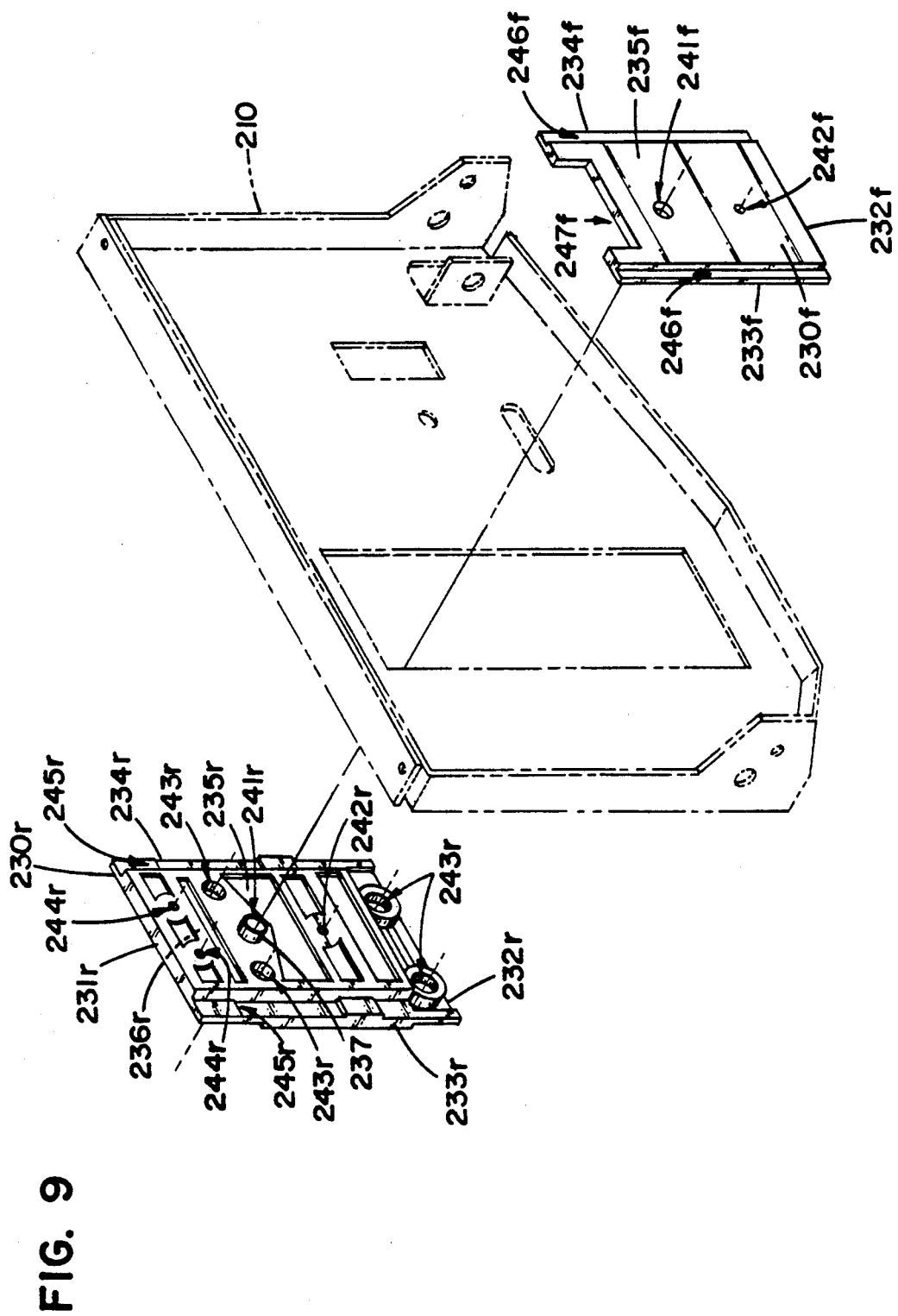
FIG. 9 is a perspective view of the clamping plate portion of the invention embodiment depicted in FIG. 8.
Figure 10:
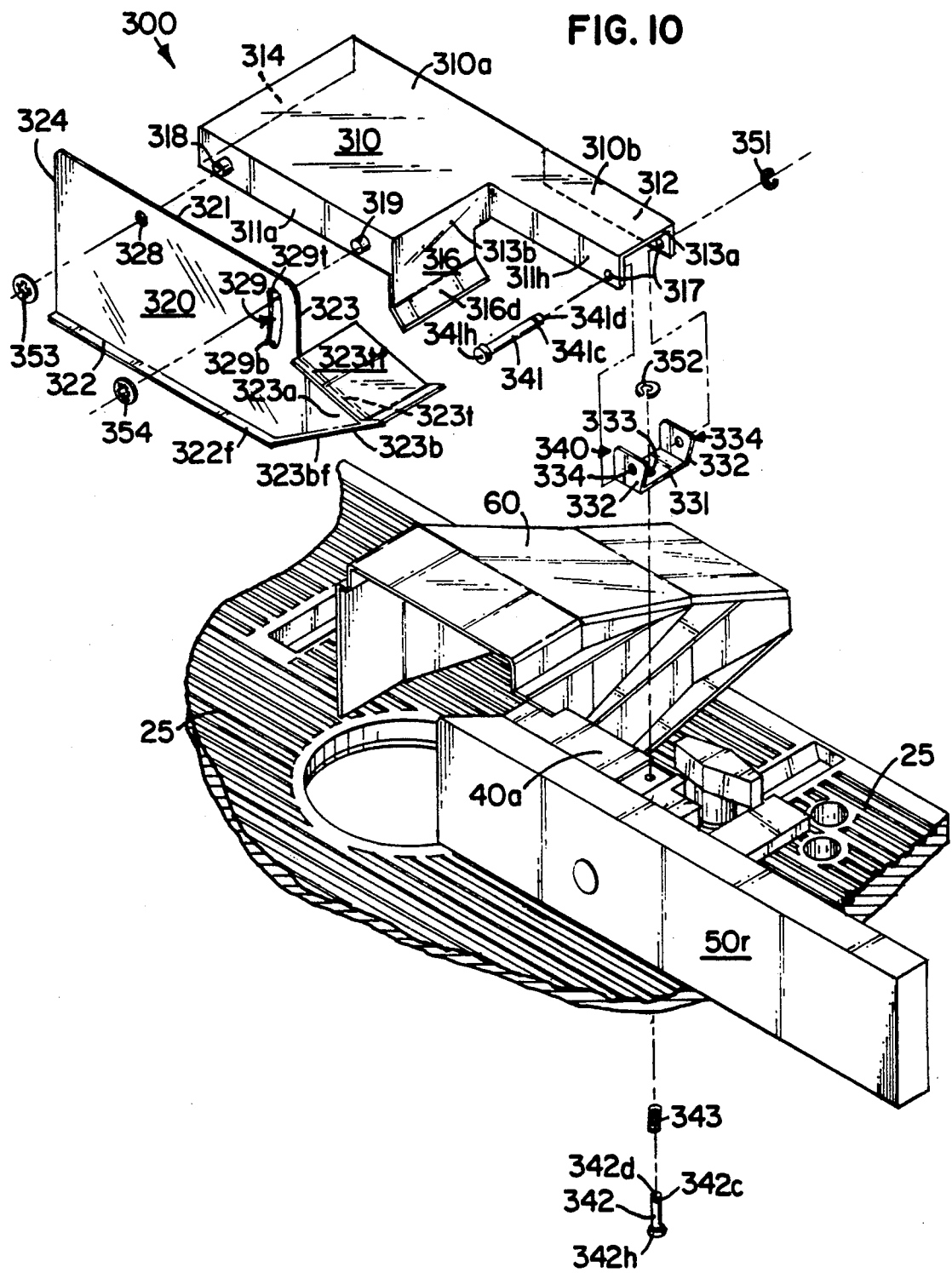
FIG. 10 is an exploded perspective view of one embodiment of the protective shield portion of the invention embodiment depicted in FIG. 1.

Referring to FIG. 8, the spindle drive pack 100 is adjustable with respect to the working surface 25 by an adjustment mechanism 200.

A base plate 210 functions as the foundation for the spindle drive pack adjustment mechanism 200 upon which the functional elements of the mechanism 200 are mounted. The base plate 210 is attached along the top 211 to the working surface 25, along the first side 213 to the front 21 of the frame 20, and along the second side 214 to the back 22 of the frame 20. For purposes of facilitating a discussion as to the orientation of the various elements of the spindle drive pack mechanism 200 upon the base plate 210, the face of the base plate 210 facing the right side panel 23 of the frame 20 shall be referenced as the front 215 of the base plate 210 while the face of the base plate 210 facing the left side 24 of the frame 20 shall be referenced as the rear 216 of the base plate 210.

The base plate 210 includes a longitudinally extending opening 221 for accommodating connection of a forward half 230f and a rearward half 230r of a clamping plate 230 such that the forward half 230f extends transversely outward from the front 215 of the base plate 210 and the rearward half 230r extends transversely outward from the rear 216 of the base plate 210. The forward half 230f and rearward half 230r of the clamping plate 230 are coupled together by a bolt 238 which extends through a first orifice 242f in the forward half 230f of the clamping plate 230 and a first orifice 242r through the rearward half 230R of the clamping plate 230. The bolt 238 retains the forward half 230f and the rearward half 230r of the clamping plate 230 in an unclamped condition such that the clamping plate 230 may be longitudinally repositioned within the longitudinal opening 221.

Clamping of the clamping plate 230 to the base plate 210 is effected by means of a clamping knob 280 which includes a handle 281, a shaft 282, a washer 284 and a bolt 285. The bolt 285 extends sequentially through a first bolt hole 241r in the rearward half 230r of the clamping plate 230 and then through a first bolt hole 241f in the forward half 230f of the clamping plate 230 such that the threaded distal end 285d of the bolt 285 extends past the front face 235f of the forward half 230f of the clamping plate 230 and the head 286 of the bolt 285 is secured to the rearward half 230r of the clamping plate 230 so as to prevent rotation of the bolt 285. The distal end 280d of the shaft 282 includes a threaded internal orifice 283 for threadably engaging the distal end 285d of the bolt 285. The shaft 282 extends through a longitudinal opening 33 in the right panel 23 of the frame 20 with the proximal end 282p of the shaft 282 connected to a handle 281 for facilitating rotation of the shaft 282. Clockwise rotation of the handle 281 causes the bolt 285 to be threadably advanced into the threaded orifice 283 in the distal end 282d of the shaft 282 and thereby clamp the clamping plate 230 to the base plate 210. Counterclockwise rotation of the handle 281 causes the bolt 285 to threadably retreat from the threaded orifice 283 in the distal end 282d of the shaft 282 so as to unclamp the clamping plate 230 and permit longitudinal repositioning of the clamping plate 230.

The washer 284 is provided between the distal end 282d of the shaft 282 and the forward half 230f of the clamping plate 230 to assist in clamping and unclamping of the clamping plate 230.

Longitudinal side channels 245r are provided in the front face 235r of the rearward half 230r of the clamping plate 230 for accommodating the lateral sides 221s of the longitudinal opening 221 in the base plate 210. Clamping of the clamping plate 230 to the base plate 210 is achieved by pinching that portion of the base plate 210 which is accommodated within the longitudinal side channels 245r provided in the rearward half 230r of the clamping plate 230 between the forward half 230f and the rearward half 230r of the clamping plate 230.

The rearward half 230r of the clamping plate 230 is connected to the end bell 170 at the upper 175t and lower 175b mounting flanges on the upper section 170t and lower section 170b of the end bell 170 by bolts 178 which extend through a set of secondary bolt holes 243r through the rearward half 230r of the clamping plate 230 and into threaded engagement with a set of nuts 177 which are retained within notches 176t and 176b in the upper 175t and lower 175b mounting flanges. The nuts 177 are retained within the notches 176t and 176b such that they do not rotate and do not move in the transverse direction when engaged by the bolts 178.

The top 231f of the forward half 230f and the top 231r of the rearward half 230r of the clamping plate 230 are held together in an unclamped state by a shoe 250. The shoe is attached to the rearward half 230r of the clamping plate 230 by a pair of bolts 265 which extend through a pair of orifices 253 in the central extension 251 of the shoe 250 and then engage the rearward half 230r of the clamping plate 230 by being threadably inserted within a pair of secondary orifices 244r in the rearward half 230r of the clamping plate 230. The shoe engages the forward half 230f of the clamping plate 230 with a central transverse extension 251 which extends into a notch 247f in the top 231f of the forward half 230f of the clamping plate 230 and a pair of side transverse extensions 252 which extend into longitudinal side channels 246f in the front 235f of the forward half 230f of the clamping plate 230.

A position indicator 260 is secured to the shoe 250 by the same bolts 265 which secure the shoe 250 to the rearward half 230r of the clamping plate (unnumbered). The position indicator 260 includes a connection plate portion 261 for facilitating connection of the position indicator 260 to the shoe 250, a needle portion 262 for indicating the position of the spindle drive pack 100 relative to the frame 20, and an extension bar portion 263 for projecting the needle portion 262 a sufficient distance from the shoe 250 so that the needle portion 262 extends through the longitudinal opening 33 in the right side panel 23 of the frame 20.

Longitudinal adjustment of the clamping plate 230 produces a corresponding longitudinal adjustment of the spindle drive pack 100. Longitudinal adjustment of the clamping plate 230 is effected by a bell crank 270 which is pivotally secured to the base plate 210 at the vertex 273 of the bell crank 270 by a bolt 277 which extends through an orifice 276 proximate the vertex 273 of the bell crank 270 and is threadably engaged within a bolt hole 223 in the base plate 210.

The lateral arm 271 of the bell crank 270 is rotatably connected to the clamping plate 230 between the forward half 230f of the clamping plate 230 and the shaft 282 of the clamping knob 280 by bolt 285. The bolt 285 extends through a laterally elongated orifice 274 proximate the distal end 271d of the lateral arm 271.

The longitudinal arm 272 of the bell crank 270 is rotatably engaged by an adjusting nut 296. A transversely extending protuberance 297 projects from the adjusting nut 296 and passes through a longitudinally elongated orifice 275 through the distal end 272d of the longitudinal arm 272 and then through a laterally elongated slot 222 in the base plate 210.

A positioning knob 290 cooperates with the adjusting nut 296 to produce lateral movement of the longitudinal arm 272 of the bell crank 270 and thereby produce longitudinal movement of the spindle drive pack 100. The positioning knob 290 includes a laterally extending threaded shaft 292 which sequentially projects through (−) a hole 224a in a first flange 217 extending transversely from the first side 213 of the base plate 210, (−) a threaded lateral passageway 298 through the adjusting nut 296, (−) a first washer 294, (−) a hole 224c in an intermediate flange 219 extending transversely from the base plate 210, (−) a hole 224b in a second flange 218 extending transversely from the second side 214 of the base plate 210, and (−) a second washer 295.

The distal end 292d of the threaded shaft 292 is retained in position by means of a roll pin 293. The proximal end 292p of the threaded shaft 292 extends through an orifice (unnumbered) in the front plate 21 of the frame 20 and is attached to a handle 291 for facilitating rotation of the shaft 292.

Rotation of the threaded shaft 292 causes the adjusting nut 296 to travel along the length of the shaft 292 and thereby causes the bell crank 270 to rotate about the bolt 277.

Rotation of the adjusting nut 296 about the shaft 292 is prevented by the protuberance 297 which extends through the elongated orifice 275 in the longitudinal arm 272 of the bell crank 270 and the laterally elongated slot 222 in the base plate 210.

OPERATION

Adjustment of the longitudinal position of the spindle drive pack 100 is effected by simply (i) rotating the handle 281 of the clamping knob 280 in a counterclockwise direction so as to unclamp the clamping plate 230, (ii) rotating the handle 291 of the positioning knob 290 to affect the desired longitudinal repositioning of the spindle drive pack (clockwise to adjust the drive pack 100 upwards and counterclockwise to adjust the drive pack 100 downwards), and (iii) rotating the handle 281 of the clamping knob 280 in a clockwise direction to reclamp the clamping plate 230 to the base plate 210 and prevent continued longitudinal movement of the spindle drive pack 100.

Rotation of the positioning knob 290 causes a domino effect which includes (i) lateral movement of the adjusting nut 296, (ii) pivoting of the longitudinal arm 272 of the bell crank 270 about the bolt 277, (iii) pivoting of the lateral arm 271 of the bell crank 270 about the bolt 277, (iv) longitudinal movement of the clamping plate 230, (v) longitudinal movement of the spindle drive pack 100, and (vi) longitudinal movement of the spindle 140.

Shield Nomenclature

| | |
|---|---|
| 300 | shield |
| 310 | horizontal plate |
| 310a | main body |
| 310b | extension arm |
| 311a | front flange on main body of horizontal plate |
| 311b | front flange on extension arm of horizontal plate |
| 312 | rear flange on horizontal plate |
| 313a | right end of main body |
| 313b | right end of extension arm |
| 314 | left end of horizontal plate |
| 316 | vertical tab |
| 316d | distal end of vertical tab |
| 317 | pair of laterally aligned holes in extension arm |
| 318 | first lateral projection |
| 319 | second lateral projection |
| 320 | vertical plate |
| 321 | upper edge of vertical plate |
| 322 | lower edge of vertical plate |
| 322f | flange along lower edge of vertical plate |
| 323 | right side of vertical plate |
| 323a | angled projection on right side of vertical plate |
| 323t | upper sloped edge of angled projection |
| 323b | lower sloped edge of angled projection |
| 323tf | upper sloped edge flange |
| 323bf | lower sloped edge flange |
| 324 | left side of vertical plate |
| 328 | orifice through vertical plate |
| 329 | arcuate slot through vertical plate |
| 329t | top of arcuate slot |
| 329b | bottom of arcuate slot |
| 330 | U-shaped bracket |
| 331 | base of bracket |
| 332 | sides of bracket |
| 333 | hole through base of bracket |
| 334 | pair of holes through sides of bracket |
| 341 | first connector pin |
| 341h | head on first connector pin |
| 341p | proximal end of first connector pin |
| 341d | distal end of first connector pin |
| 341c | circumferential channel in first connector pin |
| 342 | second connector pin |
| 342h | head on second connector pin |
| 342p | proximal end of second connector pin |
| 342d | distal end of second connector pin |
| 342c | circumferential channel in second connector pin |
| 343 | spring |
| 351 | first E-ring |
| 352 | second E-ring |
| 353 | first push ring |
| 354 | second push ring |

CONSTRUCTION

Access to the cutting tool (not shown) secured into position within the collet 131 atop the spindle 140 is controlled by a shield 300 which produces a unique dual pivoting motion which minimizes access to the cutting tool (not shown) while a work piece (not shown) is in contact with the cutting tool (not shown) without significantly interfering with operation of the router/shaper 10. Advantages achieved by the unique design of the shield 300 include enhanced protection of the user and maximized flow of wood chippings through the dust chute 60.

The shield 300 includes an upper horizontal plate 310 and a forward vertical plate 320. The horizontal plate 310 includes a main body portion 310a and an extension arm portion 310b which extends from the main body portion 310a in a first transverse direction. The distal end 313 a of the extension arm portion 310b of the horizontal plate 310 is pivotally attached to the right side fence support 40r by means of a U-shaped bracket 330.

The U-shaped bracket 330 is pivotally connected to the distal end 313 of the extension arm portion 310b of the horizontal plate 310 by a first connector pin 341 which extends through a pair of laterally aligned holes 317 in the front 311b and rear 312 flanges on the extension arm portion 310b of the horizontal plate 310 and a pair of laterally aligned holes 334 through the sides 332 of the U-shaped bracket 330. The first connector pin 341 is retained in position by a first E-ring 351 secured within a circumferential channel 341c in the distal end 341d of the first connector pin 341.

The U-shaped bracket 330 is connected to the right side fence support 40r by a second connector pin 342 which extends through a longitudinal orifice (unnumbered) in the right side fence support 40r and a hole 333 in the base 331 of the U-shaped bracket 330. The second connector pin 342 is retained in position by a second E-ring 352 secured within a circumferential channel 342c in the distal end 342d of the second connector pin 342. A spring 343 is provided between the head 342h of the second connector pin 342 and the right side fence support 340r so as to bias the bracket 330 into contact with the right side fence support 340r while permitting limited longitudinal movement of the U-shaped bracket 330.

The vertical plate 320 has a linear lower edge 322 for providing continuous contact with the upper horizontal working surface 25 and horizontal workpieces (not shown) along the entire length of the vertical plate 320. A horizontal flange 322f is provided along the length of the lower edge 322 of the vertical plate 320 for facilitating smooth passage of a workpiece (not shown) past the vertical plate 320.

The lower portion of the right side 323 of the vertical plate 320 extends to form an angled projection 323a which defines an upper sloped right edge 323t and a lower sloped right edge 323b along the right side 323 of the vertical plate 320. A laterally extending upper flange 323tf is provided along the length of the upper sloped edge 323t and a laterally extending lower flange 323bf is provided along the length of the lower sloped edge 323b. The upper flange 323tf and lower flange 323bf extend from the vertical plate 320 to proximate the right side fence half 50r for enclosing the right side of the shield 300.

The vertical plate 320 is pivotally connected at a point proximate the left side 324 of the vertical plate 320 to a front flange 311a on the main body 310a of the horizontal plate 310. A first projection 318 extends laterally outward from the front flange 311a on the horizontal plate 310 proximate the left side 324 of the horizontal plate 310 and extends through an orifice 328 proximate the left side 324 of the vertical plate 320. A first push ring 353 is attached to the first lateral projection 318 so as to pivotally secure the vertical plate 320 between the first push ring 353 and the front flange 311a on the horizontal plate 310.

A second projection 319 extends laterally outward from the front flange 311a on the horizontal plate 310 proximate the right side 313a of the main body 310a of the horizontal plate 320 and extends through a longitudinally elongated arcuate slot 329 proximate the right side 323 of the vertical plate 320. A second push ring 354 is attached to the second lateral projection 319 so as to secure the vertical plate 320 between the second push ring 354 and the front flange 311a on the horizontal plate 310 while permitting longitudinal movement of the second projection 319 within the longitudinally elongated arcuate slot 329. The longitudinally elongated slot 329 is arced about the first projection 318 to accommodate the second projection 319 during pivoting of the vertical plate 320 about the first projection 318.

The right end 313a of the main body 310a on the horizontal plate 310 includes a downwardly extending vertical tab 316 with a distal end 316d angled to the right for engaging the upper flange 323tf on the upper sloped edge 323t on the right side 323 of the vertical plate 320. Engagement between the angled distal end 316d of the vertical tab 316 on the horizontal plate 310 and the upper flange 323tf on the upper sloped edge 323t on the vertical plate 320 seals passage between the horizontal plate 310 and vertical plate 320 along the right side of the shield 310 when the vertical plate 320 is positioned in a downwardly resting position.

OPERATION

The rest position of the shield 300 positions the horizontal plate 310 across the top of the gap (unnumbered) between the right side fence half 50r and the left side fence half 50s with the vertical plate 320 extending over the front of this gap (unnumbered) with the flange 322 along the lower edge 322 of the vertical plate 20 i continuous contact with the working surface 25. The upper flange 323tf along the upper sloped edge 323t of the right side 323 on the vertical plate 320 engages the distal end 316d of the vertical tab 316 on the horizontal plate 310 so as to enclose the right side (unnumbered) of the shield 300.

Operation of the shield 300 depends upon whether the thickness of the workpiece (not shown) is greater than or less than the thickness of the longitudinal gap formed between the working surface 25 and that point along the lower edge 322 of the vertical plate 320 which is longitudinally aligned with the bottom 329b of the arcuate slot 329 when the second projection 319 is in contact with the bottom 329b of the arcuate slot 329.

Initial feeding of a workpiece (not shown) which is thicker than the longitudinal gap defined above sequentially causes (i) contact between the front end of the workpiece (not shown) and the lower flange 323bf which extends along the lower sloped edge 323b on the right side 323 of the vertical plate 320, (ii) upward pivoting of the vertical plate 320 about the first projection 318 until the bottom 329b of the arcuate slot 329 contacts the second projection 319, (iii) upward pivoting of the vertical plate 320 and the horizontal plate 310 about the second connector pin 341, and (iv) downward pivoting of the vertical plate 320 about the first projection 318 until the lower edge 322 of the vertical plate 320 contacts the upper surface of the workpiece (not shown) along the entire length of the lower edge 322. Continued movement of the workpiece (not shown) completely past the shield 300 sequentially causes (v) downward pivoting of the vertical plate 320 about the first projection 318 until the upper flange 323tf along the upper sloped edge 323t of the right side 323 on the vertical plate 320 engages the distal end 316d of the vertical tab 316 on the horizontal plate 310, and then (vi) pivotable free-fall of the plates 310,320 about the second connector pin 341 until the lower edge 322 of the vertical plate 320 rests upon the working surface 25.

Feeding of a workpiece (not shown) which is not as thick as the gap defined above results in the same sequence of steps detailed above with respect to a workpiece which is thicker than the gap except that upward pivoting of the vertical plate 320 about the first projection 318 stops before the bottom 329b of the arcuate slot 329 contacts the second projection 319.

Due to friction between the vertical plate 320 and the projections 318,319 during pivoting of the vertical plate 320 about the first projection 318, the horizontal plate 310 may be pivoted about the first connector pin 341 to some degree prior to complete pivoting of the vertical plate 320.

I claim:
1. A shield for a cutting blade which comprises:
 a first plate having a first longitudinal end and a second longitudinal end wherein the first plate is longitudinally pivotable about a first pivot point proximate the first longitudinal end of the first plate,
 a second plate having first and second longitudinal ends which correspond lengthwise with the first and second longitudinal ends of the first plate wherein the second plate is longitudinally pivotally connected to the first plate about a second pivot point proximate the respective second longitudinal ends of the first and second plates.

2. The shield of claim 1 wherein the second plate is configured and arranged substantially transversely to the first plate.

3. The shield of claim 2 including a means for limiting pivoting of the second plate towards the first plate such that a force urging the second plate towards the first plate results in pivoting of the second plate about the second pivot point until the limit is reached at which point continuation of the force urging the second plate towards the first plate results in pivoting of the first plate about the first pivot point.

4. The shield of claim 3 wherein the limiting means comprises a projection extending from the first plate longitudinally intermediate the first and second pivot points which is slidably engaged within an enclosed slot in the second plate.

5. The shield of claim 2 wherein the first plate is horizontally positioned over a cutting blade receiving gap defined by a pair of longitudinally aligned work-engaging surfaces and the second plate is vertically positioned in front of the cutting blade receiving gap wherein the first and second plates cooperate with the work-engaging surfaces to define a chamber encompassing the gap which is open in the back.

* * * * *